Figure 1:
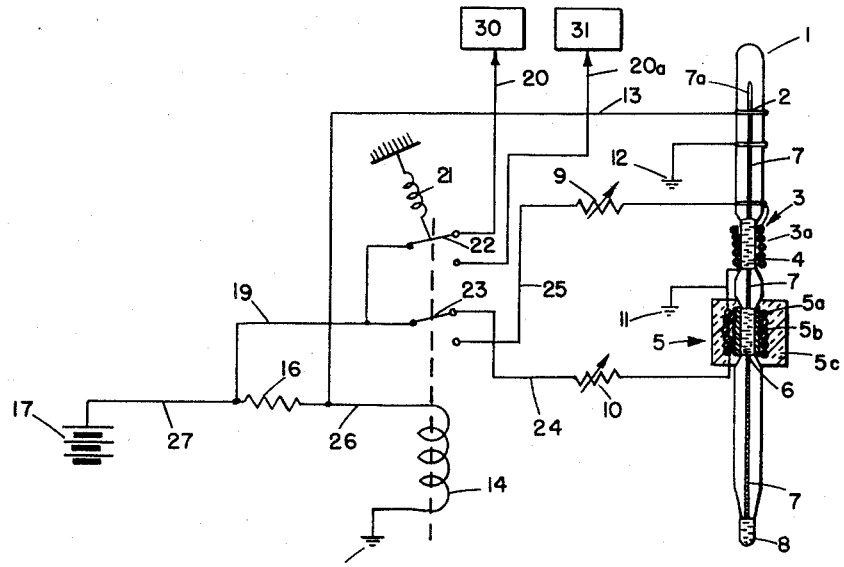

May 3, 1960     F. W. THUNBERG, JR     2,935,657

ANTICIPATOR COMPENSATOR THERMOSTAT

Filed May 4, 1956

*INVENTOR.*
FRANK W. THUNBERG Jr.
BY
ATTORNEY

2,935,657

ANTICIPATOR COMPENSATOR THERMOSTAT

Frank W. Thunberg, Jr., Downey, Calif., assignor to North American Aviation, Inc.

Application May 4, 1956, Serial No. 582,760

3 Claims. (Cl. 317—132)

This invention relates to an improvement on an anticipator type thermostat, said improvement being a compensator for the anticipator.

In order to maintain full controlled ambient temperatures for electronic equipment, such as in a guided missile, piloted aircraft, or in any confined space where the temperatures go beyond the limits required for proper operation of the equipment, refrigeration or heating systems are required to control the ambient air temperatures. Anticipator type thermostats are required to actuate such systems but without some form of compensator for the anticipator, they are not satisfactory.

An anticipator on a thermostat is comprised generally of a heating coil wrapped around the thermostat to artificially heat it so that the thermostat will function in advance of what it normally would, if it depended upon its ordinary temperature sensing means. In other words, a thermostat having an anticipator provides fast actuation of the refrigerating or heating system to prevent the rising or falling of the temperature beyond its upper and lower predetermined limits. That is, an anticipator prevents what is sometimes called temperature overshoot. However, an undesirable result, known as droop, occurs with the use of anticipator thermostats when the heat load and average time of the cooling or heating operation changes. Droop is the change in the average cooling or heating air temperature when the heat load changes during controlled cooling or heating, other conditions remaining constant. It is also defined as the change of the average controlled temperature when the percentage of time that cooling or heating is required is changed.

If an ordinary thermostat is used, i.e., one without an anticipator, the problem of droop does not occur; the average temperature is constant but there is considerable fluctuation of the instantaneous temperature. In other words, without an anticipator, the very desirable quick time response to temperature changes is not obtained. According to the present invention, an anticipator thermostat provides the quick time response to temperature changes, and at the same time a compensator, which is an additional heating means on the thermostat, eliminates the problem of droop.

In the use of an ordinary mercury column, make-and-break contact type thermostat, having a mercury sensing bulb, the instantaneous air temperature fluctuates considerably more than the thermostat sensing bulb temperature because the sensing bulb is slow to react to the change in air temperature. With a make-and-break type thermostat having an anticipator, the instantaneous temperature fluctuation is lessened; and with a constant heat load, the average controlled temperature remains the same. The anticipator thermostat cycles itself within a certain ambient air temperature range, and the maximum of this predetermined range is the nominal setting of the thermostat. However, with the latter type thermostat in a cooling operation, for example, when the heat removal requirement or heat load to the heat exchanger increases, the average controlled temperature rises to an extent to allow possible damage to and poor operation of the equipment intended to be cooled. For example, undesirable changes may occur in lengths of metals, voltages of batteries, viscosities, densities, electrical resistances and transistor constants.

An anticipator type mercury column thermostat, in addition to the air temperature sensing bulb, has a second mercury bulb about which an anticipator heating coil is wound. This coil is energized during the non-cooling period. The amount of average heat to be applied to the anticipator bulb by the coil is determined by experimentation. When the heat on the air sensing bulb and on the anticipator bulb causes the mercury column to make contact and start the cooling operation, the anticipator coil is deenergized. When the heat load is increased, the average temperature of the anticipator bulb is decreased, the coil being deenergized for longer periods, and the average temperature of the air bulb is increased. The latter is true because the volume of the mercury in a thermostat is substantially constant.

It is desirable to apply a relatively high voltage, experimentally determined, to an anticipator coil to minimize temperature overshoot. However, in operating under changing heat loads, the greater the average heat applied to the anticipator bulb, the greater the droop, i.e., a given change in heat load will change the value of heat to the coil more if a higher voltage is applied to the coil than if a lower voltage is applied. This greater change in average heat applied to the anticipator coil causes greater air bulb and cooling air temperature change, both being of the same amount. Further, the average absolute temperatures of the air bulb and the cooling air will be the same. Then, as stated above, as the average temperature of the air bulb is increased and since this temperature is equal to the average controlled cooling air temperature, it follows that the latter temperature is also increased. This increase is caused by the increase in heat load, and it is the phenomenon known as droop.

To overcome the droop problem without destroying the anticipator effect, according to the present invention, a compensator is added to the anticipator type thermostat. The compensator comprises generally a thin metallic sheet damper wound around a third mercury filled bulb, with a heating coil wound around the metallic sheet. This heating coil is similar to the anticipator coil. Insulating material can be used to cover both the metallic sheet dampener and the coil. This coil is energized during the cooling operation to heat the dampener and the mercury in the bulb.

It is, therefore, an object of this invention to provide an improved thermostat.

A principal object of this invention is to provide an anticipator type thermostat with a second heating coil to eliminate the problem of droop.

A further object of this invention is to provide a mercury column type thermostat having an anticipator and a compensator.

A still further object of this invention is to provide a bimetallic element type thermostat having an anticipator and a compensator.

Another object of this invention is to provide a thermostat which simultaneously limits the variation of the instantaneous controlled air temperature to 2° F. and the variation of the average controlled air temperature to ½° F. when the heat load is changed and the percentage of time that heating or cooling is required is changed.

A still further object of this invention is to provide an anticipator-compensator thermostat and an electrical system with which it functions to properly control the operation of a cooling and/or heating system.

Figure 2:
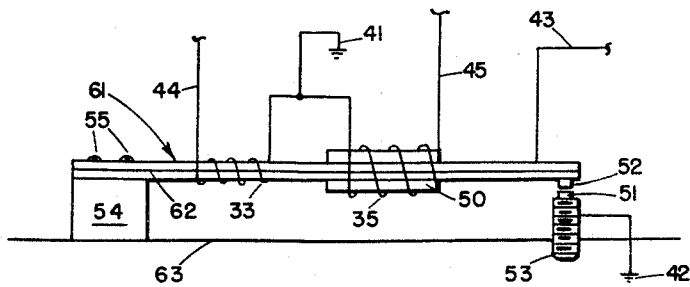

Other objects of invention will become apparent from the following description taken in connection with the accompanying drawings, in which:

Fig. 1 is an illustration of a mercury column type thermostat, having an anticipator and a compensator, and its operational electrical circuit; and Fig. 2 is a bimetallic element type thermostat with electrical leads for connection to the circuit in Fig. 1.

Referring to Fig. 1, mercury column type thermostat 1 has anticipator 3 and compensator 5 spaced in mercury column 7. Air sensing mercury bulb 8 is connected to the lower end of mercury column 7. Anticipator 3 comprises heating coil 3a, which is wound around mercury bulb 4, said bulb being connected on both ends to mercury column 7. Compensator 5 is comprised of mercury bulb 6, dampener 5b, heating coil 5a and insulating material 5c. Mercury bulb 6 is similar to bulb 4 and is also connected at both ends to mercury column 7. Dampener 5b, secured around bulb 6, can be made of thin sheet metal or of other heat absorbing material. Heating coil 5a, preferably made of fine wire, and having common ground 11 with coil 3a, is wound around dampener 5b in a manner to resemble coil 3a. Heat insulating material 5c, such as glass fiber wool, solid plastic, or an enclosed air space, surrounds bulb 6, sheet 5b and coil 5a.

Thermostat 1 is of the make-and-break contact type having wire 13 extending into the mercury column tube 7a at point 2. The thermostat actuates a cooling system, for example, when the mercury is caused to rise in the column and contact wire 13 at point 2. Column 7 is connected to ground 12. Lead 13 is connected to one side of relay 14 which is connected to operate double-pole, double-throw switches 22 and 23 and to resistor 16 which is connected to D.-C. source 17 by lead 27. The other side of relay 14 is connected to ground 15. When contact is made at point 2, resistor 16 limits the current through the mercury column and reduces the voltage in lead 26 effectively shorting out relay 14. When the contact at point 2 is broken, resistor 16 reduces the voltage a relatively small amount and allows sufficient current flow through lead 26 to actuate relay 14. Switches 22 and 23, operated by relay 14, are connected to D.-C. source 17 by leads 19 and 27. They are shown held closed in their normal position by spring 21. In this position a signal from D.-C. source 17 via leads 27, 19 and 20 causes refrigeration system 30 to operate. Cooling system 30 may include a coil heat exchanger through which a cooled fluid is pumped. The air being cooled could be forced through this heat exchanger and thermostat 1 could be located at its inlet or outlet. Switches 22 and 23 remain in the positions shown while mercury column 7 is in contact with lead 13 at point 2. In the position shown, switch 23 connects the D.-C. source via leads 27 and 19 to provide current to the compensator coil 5a through lead 24 and variable resistor 10. When the contact is broken at point 2, relay 14 operates to move switch 22 to disconnect lead 20, causing the cooling system to shut off. In the same action, switch 23 is closed to lead 25 so as to supply heat to anticipator coil 3a through variable resistor 9, and compensator coil 5a is deenergized. Also in the same action, if a heating system 31 is to be controlled by thermostat 1, lead 20a is connected so that it is closed by switch 22 to allow a signal to start the heating system in the same manner that lead 20 carries current to provide a signal to start the cooling system. Heating system 31 may include a coil heat exchanger through which a heated fluid is pumped. The air being heated could be forced through the latter heat exchanger and thermostat 1 could be located at its inlet or outlet.

In a cooling operation, for example, when the heat load increases, the average heat to the compensator bulb 6 increases and, consequently, the average temperature of the latter increases. At the same time, the average heat to anticipator bulb 4 decreases because coil 3a is deenergized when the cooling system is operating, and its average temperature decreases. It should be noted that the latter also occurs in a thermostat having an anticipator without a compensator. However, without the compensator when the mercury in the anticipator bulb contracts, the mercury in the air sensing bulb must expand, since the total volume of the mercury in the thermostat must stay substantially constant. This expansion can occur only when the temperature of the cooling air and the temperature of the mercury in the air sensing bulb are increased. This is the droop effect. However, with the compensator, the mercury in the compensator bulb expands, and as stated above, the mercury in the anticipator bulb contracts. Then again, since the total volume of the mercury in the thermostat must stay substantially constant, the temperature of the air bulb, which senses the cooled air temperature, must remain constant. Thus, with the compensator the droop is eliminated.

It is important that the compensator should not perform as a second anticipator, i.e., it should not instantaneously heat up the mercury in the compensator bulb. This is avoided by thin sheet metal dampener 5b surrounding compensator bulb 6.

The amount of heat supplied to the anticipator and compensator bulbs by coils 3a and 5a, respectively, is adjusted by experiment with variable resistors 9 and 10 so that the total average heating to both coils together is relatively constant for all heating loads. Then, the average of the anticipator and compensator bulb temperatures is nearly constant and, therefore, the average air temperature over air bulb 8 is nearly constant; that is, having a variation of less than ½° F.

The heat transference from compensator coil 5a through sheet metal dampener 5b to the mercury in the compensator bulb is poor. This is desirable because it increases the time constant of the compensator coil; or in other words, the poor heat transfer, the additional mass and its specific heat decreases the response of the compensator mercury bulb so that the compensator coil provides slow heating and negligible anticipator effect. In the anticipator the heating effect is immediate; in the compensator, it is not. When the compensator heater is off, the sheet metal gives up stored heat to the mercury to keep it at a relatively constant temperature and constant volume. Insulating material 5c prevents heat loss from dampener 5b when coil 5a is deenergized. However, the compensator will function effectively without insulation.

If a cooling and heating system are controlled by the same thermostat, when the contact at point 2 is broken, switch 22 moves to break the connection with lead 20 and makes a connection with lead 20a, providing a signal to cause heating system 31 to operate. A heating system provides a flow of warm air over the equipment in the same manner as a cooling system provides a flow of cool air. When the heating system is controlled by a separate thermostat, it is controlled in the same manner, except that there would be no lead 20, and switch 22 is closed to lead 20a by the action of the relay when the contact at point 2 is broken. In other words, the circuit would be generally the same as that shown in Fig. 1.

With a thermostat having an anticipator but having no compensator, as more heating is required to maintain the desired air temperature, the anticipator coil is heated more of the time and the controlled air temperature will decrease. This, again, is droop but in the heating cycle. However, when the compensator is added, as the heating of the anticipator is increased due to the increased requirement for heating, the heating of the compensator decreases, allowing the controlled air temperature to stay constant. This is analogous to the description of the cooling operation. Thus also, in a heating system, the compensator eliminates the droop.

Fig. 2 illustrates a bimetallic element type thermostat 61, having an anticipator coil 33 and a compensator coil 35, which function in the same manner as those in Fig. 1. The electrical circuit is not shown as it is identical to that shown in Fig. 1. Bimetallic strip 62 is secured on one end to insulated block 54 on base 63 by rivets 55 and has contact 52 on the other end thereof. Contact 52 closes against contact 51 when strip 62 is heated to a predetermined temperature. Contact 51 is secured to adjustable screw 53 which, when turned in one direction or the other, changes the temperature at which contact will be made. Adjustable screw 53 is connected to ground 42. When contacts 51 and 52 meet, the current through lead 43, equivalent to lead 13 in Fig. 1, causes the relay to operate in the same manner as described above. Lead 44 is connected to a variable resistor, as 9 above, and supplies current to anticipator coil 33 when the cooling system is not operating. Anticipator coil 33 and compensator coil 35 have common ground 41. When points 51 and 52 are in contact, anticipator coil 33 is deenergized and compensator coil 35 is energized through lead 45 and a variable resistor, such as 10 in Fig. 1. A thermal resistance means 50, having a high specific heat capacity, such as glass, is placed between compensator coil 35 and bimetallic strip 62. This slows the heating of strip 62 in the same manner as sheet 5b slows the heating of bulb 6 in Fig. 1.

In the operation of a bimetallic element type thermostat having an anticipator and a compensator, when anticipator 33 and compensator 35 are heated, they each cause a local bending of the bimetallic element and a deflection of the movable end to which contact 52 is attached. In addition, the temperature of the surrounding air causes a further bending and deflection of the thermostat element as a whole. By means of screw 53, contact 51 is adjusted so that contact 52 connects with the latter to maintain the desired control temperature. If contact 52 is moved away from contact 51 by a temperature change, the circuit will act to cause an opposite temperature change which will move contact 52 to again connect with contact 51. Since the position of movable contact 52 is substantially constant, the sum of all the deflections caused by the anticipator, compensator and air temperature must be substantially a constant. In a cooling operation, as the requirement for cooling increases, the anticipator winding is heated less of the time, causing less deflection. However, the compensator winding is then heated more of the time, causing more deflection. To achieve a substantially constant controlled surrounding air temperature, the voltage of the anticipator and compensator coils should be adjusted so that the decrease of one deflection is compensated by the decrease to the other deflection in order that the surrounding air temperature need not change to keep the total deflection constant, as is required. This again avoids droop.

Similar to the heat transference through sheet metal dampener 5b of Fig. 1 above, the heat transference through glass 50 to bimetallic strip 62 is poor, and the discussion above relative to this also applies here.

In view of the above, for cooling and heating operations where it is necessary to maintain both the instantaneous and average temperatures substantially constant, i.e., within ½° F., the compensator for an anticipator type thermostat is a definite advance in the art.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A mercury column type thermostat comprising a mercury column in a tube, a temperature-sensing first mercury bulb at one extremity of said tube, a second and third mercury bulb interspaced in said mercury column, a first heating element surrounding and connected to heat said second bulb, a thin metal sheet surrounding said third bulb, a second heating element surrounding and connected to heat said metal sheet and said third bulb, means to alternatively electrically energize said first and second heating elements, and heat insulating means surrounding said second heating element and said third bulb.

2. A mercury column type thermostat comprising a mercury column in a tube, a temperature-sensing first mercury bulb in said tube, a second and third mercury bulb interspaced in said mercury column, a first heating element surrounding and connected to heat said second bulb, a thin metal sheet surrounding said third bulb, a second heating element surrounding and connected to heat said metal sheet and said third bulb, and heat insulating means surrounding said second heating element and said third bulb.

3. A mercury column type thermostat comprising a mercury column tube, a temperature-sensing first mercury bulb in said tube, a second and third mercury bulb interspaced in said mercury column, a first heating element surrounding and connected to heat said second bulb, a heat retaining means surrounding said third bulb, a second heating element surrounding and connected to heat said third bulb and said heat retaining means, and heat insulating means surrounding said second heating element and said third bulb.

References Cited in the file of this patent

UNITED STATES PATENTS

| | | |
|---|---|---|
| 2,171,803 | Parks | Sept. 5, 1935 |
| 2,280,667 | Scott | Apr. 21, 1942 |
| 2,295,340 | Fiene | Sept. 8, 1942 |
| 2,302,603 | Davis | Nov. 17, 1942 |
| 2,346,592 | Lehane | Apr. 11, 1944 |
| 2,421,953 | MacKendrick | June 10, 1947 |
| 2,626,311 | Engelhard | Jan. 20, 1953 |